Dec. 9, 1969  K. G. KREUTER  3,482,588
ELECTRICALLY MODULATED PRESSURE REGULATING
AND MONITORING MEANS
Original Filed Sept. 15, 1964  3 Sheets-Sheet 1
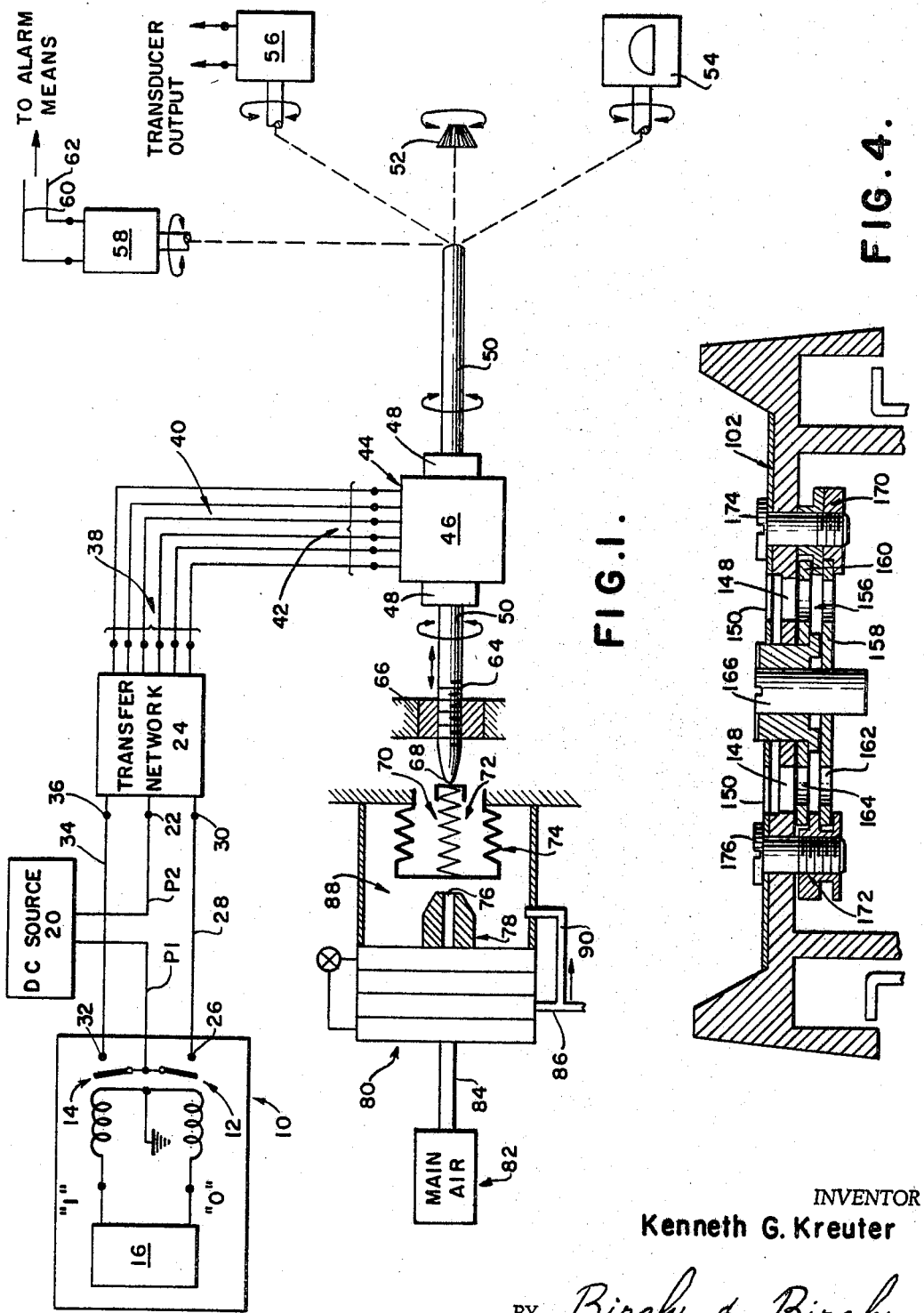
INVENTOR
Kenneth G. Kreuter
BY *Birch & Birch*
ATTORNEYS Dec. 9, 1969

K. G. KREUTER 3,482,588

ELECTRICALLY MODULATED PRESSURE REGULATING
AND MONITORING MEANS

Original Filed Sept. 15, 1964

INVENTOR
Kenneth G. Kreuter

BY Birch & Birch

ATTORNEYS

INVENTOR
Kenneth G. Kreuter

BY Birch & Birch

ATTORNEYS

United States Patent Office 3,482,588
Patented Dec. 9, 1969

3,482,588
ELECTRICALLY MODULATED PRESSURE REGULATING AND MONITORING MEANS
Kenneth G. Kreuter, Goshen, Ind., assignor to Robertshaw Controls Company, Richmond, Va., a corporation of Delaware
Original application Sept. 15, 1964, Ser. No. 396,661. Divided and this application Aug. 25, 1967, Ser. No. 681,943
Int. Cl. F15b 21/04
U.S. Cl. 137—85  5 Claims

ABSTRACT OF THE DISCLOSURE

A pilot operated pressure control relay with feedback in which the input to the pilot valve is via a rotary stepping motor, the movement of which is transmitted to the pilot valve via a reciprocating shaft which compresses a spring. The other end of the shaft extends from the motor and is connected with indicator means, electrical transducer means and cam operated limit switches.

---

This is a division of application Ser. No. 396,661, filed Sept. 15, 1964.

These pulses may be of constant duration or they may be duration modulated within the particular states; either of these types of modulation being readily achievable by starting with one such state and coupling the computer output signals through suitable transfer networks.

For the sake of example, this invention will be described in conjunction with the use of bilevel duration modulated pulse signals as the computer output signals, said signals appearing as constant amplitude, positive or negative polarity rectangular waveforms of variable duration. The pulse durations are representative of the degree of change of the controlled variable while the polarities are representative of the direction of change of the controlled variable.

It is an object of this invention to provide a pressure regulator means wherein a duration-modulated binary electric output signal from a digital computer or the like is first converted to a displacement and the said displacement subsequently converted to a functionally related control pressure.

It is another object of this invention to provide a pressure regulator means comprising a pneumatic relay and an electric stepping motor for modulating the pressure output of said relay, said stepping motor being driven through a displacement in response to a binary electric control signal.

Still another object of this invention is to provide a system for positioning a control valve or other displaceable control means in discrete quantized steps.

Yet another object of this invention is to provide a new and novel pressure regulator means.

These and other objects of this invention will become more fully apparent with reference to the following specification and drawings which relate to a preferred embodiment of the invention.

Figures 3, 5:
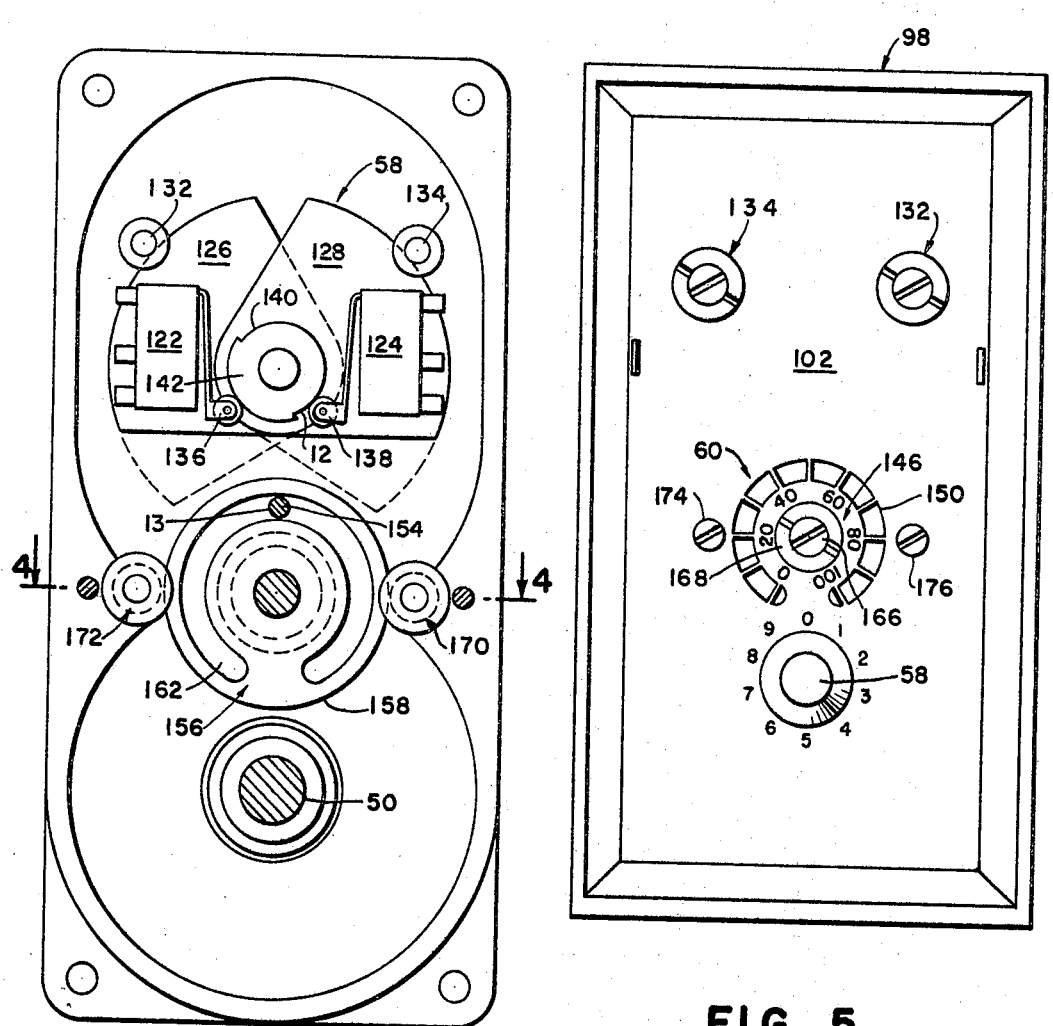
Figure 2:
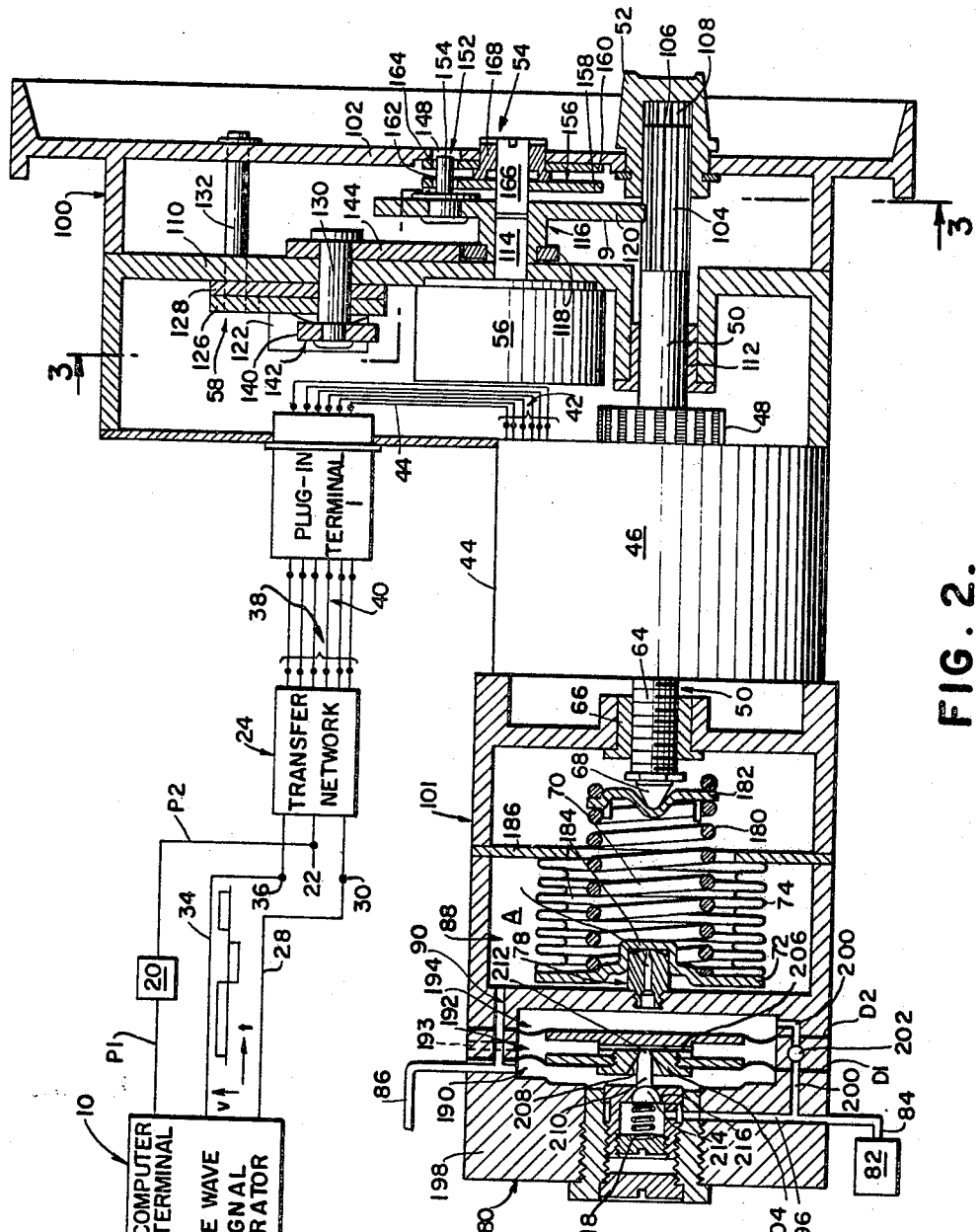

In the drawings:
FIGURE 1 is a schematic diagram of a pressure regulator means of the present invention;
FIGURE 2 is a side elevation, in cross-section, of a physical embodiment of the invention;
FIGURE 3 is a cross-section taken along line 3—3 of FIGURE 2;
FIGURE 4 is a cross-section taken along line 4—4 of FIGURE 3; and
FIGURE 5 is a front plan view of FIGURE 2.

Basically, the system of the present invention includes a computer output means providing a duration-modulated binary electric control signal; a transfer network receiving said control signal and producing a quantized control signal in response thereto, said quantized control signal comprising a train of energizing pulses of constant duration, the number of pulses representing and quantizing the duration of the particular state of the said control signal being transmitted from the computer output means to the said transfer network; a stepping motor driven through a rotary displacement in response to the quantized control signal; rotary-to-linear displacement converting means driven by the stepping motor; rotary displacement limit control means for said stepping motor; mechanical and electrical means providing visual and electrical output data as a function of said rotary displacement; and pneumatic relay means modulated by said rotary-to-linear displacement converting means to provide a control pressure signal as a function of said duration-modulated binary electric control signal.

Referring in detail to the drawings, and more particularly to FIGURE 1, the system of the present invention is shown as including a digital computer output means 10 comprising first and second relay switches 12 and 14, respectively, representative of the two different states of a binary signal. The coils of the relay switches 12 and 14 are selectively energized by the binary output signal of a digital computer means 16, generally shown in block diagram form as having two output leads "1" and "0" representing the binary output states of the said computer 16.

The relay switches 12 and 14 are connected with a common terminal 18, to which is connected a first power lead P1 of a suitable direct current power supply 20. A second power lead P2, representing the other side of the power supply 20 is directly connected to the common or neutral input terminal 22 of a transfer network 24.

The first relay switch 12 is connected to respond to a zero state output from the computer terminal "0" and is provided with a terminal contact 26 connected, via a lead 28 to an input terminal 30 of the transfer network 24.

The second relay switch 14 is connected to respond to a unit state output from the computer terminal "1" and is provided with a contact terminal 32 connected, via a lead 34, to the remaining input terminal 36 of the transfer network 24.

The transfer network 24 is provided with a plurality of output terminals 38 connected, respectively, via a like plurality of leads 40 with a like plurality of input terminals 42, respectively, on the stator 44 of a D.C. stepping motor 46.

The stepping motor 46 includes a rotor 48 having an integral coaxial rotor shaft 50 extending from both ends thereof.

One extension of the rotor shaft 50 is in mutual driving connection with a manual override means 52, an indicator means 54, an electric transducer means 56 and limit detecting switch means 58 as will be hereinafter more fully described in connection with FIGURES 2, 3 and 4.

The limit detecting switch means 58 is adapted to be connected with alarm means or the like via leads 60 and 62 such that automatic indication is provided in the event that the rotor 48 of the stepping motor 46 achieves a predetermined limit of travel in either direction of rotation thereof.

The other extension of the rotor shaft 50 includes a threaded portion 64 which extends through an internally threaded fixed collar 66, such that as the rotor 48 is displaced in rotation it is also linearly displaced, along with the rotor shaft 50, along its axis of rotation because of the interaction of the threaded portion 64 with the fixed collar 66.

The outer tip 68 of the said other extension of the rotor shaft 50 is in abutting engagement with one end of a compression spring push-link 70 which in turn, at its other end, engages one side of a leakport flap 72 mounted integrally with a bellows means 74 which expands and contracts coaxially with the rotor shaft 50.

The leakport flap 72 is in immediate proximity with a leakport 76 in the tip of a pilot pressure control nozzle 78, the said control nozzle extending from a pneumatic relay means 80.

The pneumatic relay means 80 is supplied with supply pressure from a main air supply 82 via a supply line 84 and includes a control pressure signal or branch pressure output port 86. The branch pressure output is fed back to a closed rebalancing chamber 88, surrounding the leakport nozzle 78 and bellows assembly 74, via a pressure feedback lead 90.

Referring now to FIGURES 2 and 5, a preferred physical embodiment of the pressure regulator means of the present invention is shown as including a first housing portion 100 and a second housing portion 101 joined together through the stator 44 of the D.C. stepping motor 46 previously described with reference to FIGURE 1. Like parts in FIGURES 1 and 2 bear like numerals.

The first housing portion 98 includes a framed face plate 102 through which one end of the rotor shaft 50 projects. The said one end of the rotor saft 50 is longitudinally splined about its circumference in an area 104 extending from an intermediate point of the said rotor shaft 50 to the outer tip 106 of the said one end.

Rotatably journalled in the face plate 102, coaxial with the rotor shaft 50, is the manual override or control knob 52. The knob 58 is externally concentric with the rotor shaft 50 and carries internal splines 108 such that it is keyed to the splined portion 104 of the rotor shaft 50 and rotates therewith while permitting telescopic axial displacement of the outer tip 106 of the rotor shaft 50 therein.

The first housing portion 100 includes an internal mounting plate 110 substantially parallel with and spaced from the face plate 102. The rotor shaft extends through the mounting plate 110 wherein it is supported by a main journal bearing 112. The mounting plate 110 further supports the rotary electric transducer means 56 previously described with reference to FIGURE 1, the transducer means including a rotary operating shaft 114 extending through the mounting plate 110. A reduction gear unit 116 including a driven pinion 118 and a relatively smaller diameter coaxial drive pinion 120 are coaxially fixed on the operating shaft 114 for rotation therewith. The driven pinion 118 is intermeshed with and driven by the splined portion 104 of the rotor shaft 50.

Referring additionally to FIGURE 3, the limit detecting switch means 58, previously described with reference to FIGURE 1, is shown mounted on the mounting plate 110 above the electric transducer means 56.

The limit detecting switch means 58 includes first and second limit detecting switches 122 and 124 mounted, respectively, on first and second peripherally toothed sector plates 126 and 128, freely pivoted on a cam shaft 130 extending through the mounting plate 110. First and second splined shafts or pinions 132 and 134 respectively intermeshed with the toothed peripheries of the first and second sector plates 126 and 128 are provided, respectively, to constrain the said first and second plates 126 and 128 in selectively adjusted positions about the cam shaft 130. The said splined shafts 132 and 134 extend through both the mounting plate 110 and the face plate 102 and are journalled therein for rotation.

The first and second limit detecting switches 122 and 124 are provided, respectively, with first and second cam follower type switch actuators 136 and 138 which are in constant following contact with the camming surface 140 of a rotary actuating cam 142 coaxially mounted on the cam shaft 130 for rotation therewith.

Rotation of the cam shaft 130, and consequently the actuating cam 142, is effected by means of a driven sector gear 144 fixed to the cam shaft 130, on the opposite side of the mounting plate 110, which sector gear 144 is intermeshed with the drive pinion 118 on the reduction unit 116.

Referring jointly to FIGURES 2, 3, 4 and 5, the mechanical indicator means 54, previously described with reference to FIGURE 1, is shown as including a dial face or index means 146 which, in turn, includes an arcuate through-slot 148 in the face plate 102 which may, as shown in FIGURE 5, be covered with an indexed transparent cover plate 150.

The moving index 152 of the indicator 54 comprises a pin 154 mounted on a radius of the driven pinion 120 of the reduction unit 116 and extending parallel to the axis of rotation of the said driven pinion into the arcuate through-slot 148 whereby its position in the said slot may be viewed externally of the face plate 102.

The pin 154 also serves as an integral part of a mechanical limit stop means 156, the latter comprising first and second coaxially mounted, relatively rotatable circular stop plates 158 and 160, respectively, having first and second discontinuous circular through-slots 162 and 164 therein, respectively. The said slots 162 and 164 are in registry such that the index pin 154 passes through them between the driven pinion 120 and the face plate 102.

The first stop plate 158 is coaxially mounted for rotation with a short control shaft 166 coaxial and relatively rotatable with the reduction unit 116 and extending therefrom through the face plate 102.

The second stop plate 160 is coaxially mounted for rotation with a second control shaft 168 which is concentric and relatively rotatable with the first control shaft 166 and further, which is journalled for rotation in the face plate 102.

First and second clamping means 170 and 172 are provided, respectively, for securing the first and second stop plates 158 and 160 in positions of relative rotation such that the discontinued portions of the arcuate slots 162 and 164 therein may be selectively positioned to engage the index pin 154 at predetermined limits of travel thereof. The first and second clamping means 170 and 172 are actuated, respectively, by means of first and second set screws 174 and 176 which extend through the face plate 102.

The second housing portion 101 of the pressure regulator means, as shown in FIGURE 2, includes a first internal partition 178 through which the internally threaded collar 66, through which the threaded portion 64 of the rotor shaft 50 extends as described previously with reference to FIGURE 1, is fixedly mounted.

The compression spring push-link 70, previously described with reference to FIGURE 1, is shown as comprising a helical compression spring 180 having a dimpled plate 182 affixed to one end thereof and juxtaposed with the tip 68 of the rotor shaft 50. The other end of the spring 180 surrounds a cylindrically upset portion 184 of the reciprocable leakport control flap 72, which upset portion 184 is internally concentric with the spring 180.

The spring 180 extends through a second internal partition 186 in the second housing portion 101. The second partition 186 also serves as the mounting means for the flexible bellows 74, previously described with reference to FIGURE 1, the said bellows 74 being soldered or otherwise made integral at one end with the said second partition 186 and at the other end with the leakport control flap 72. The bellows 74 is externally concentric with the spring 180.

The pneumatic relay means 80, previously described with reference to FIGURE 1, is constructed as a substantially integral extension of the second housing portion 100 and includes a main pressure chamber 188, a branch pressure or control signal pressure chamber 190, an exhaust chamber 192 vented to atmosphere via flow port 193 and a pilot pressure chamber 194.

The pilot pressure chamber 194 is vented to the rebalancing chamber 88 through the leakport 76 in the leakport nozzle 78, previously described with reference to FIGURE 1, the said nozzle 78 extending concentrically and telescopically into the cylindrical upset portion 184 in the leakport control flap 72.

The main air pressure chamber 188 is supplied with pressure from the main air supply 82 via pressure lead 84 and an internal connecting port 196 in the base 198 of the pneumatic relay 80.

The pilot pressure chamber 194 is supplied with pressure from the main air supply 82 through an integral flow port 200 having an in-line flow restrictor 202 therein, the said flow port 200 interconnecting the internal connecting port 196 with the said pilot chamber 194 via the flow restrictor 202.

The branch pressure, exhaust and pilot pressure chambers 190, 192 and 194 are respectively separated by a pair of relay diaphragms D1 and D2 which are joined in spaced-apart relationship by a floating valve spindle 204.

The pressure feedback lead 90 extends between the branch pressure chamber 190 and the rebalancing chamber 88 internally of the structure of the pneumatic relay 80.

The valve spindle 204 includes an internal flow port 206 selectively interconnecting the exhaust chamber 192 with the branch pressure chamber 190 via an integral valve seat 208 in the said spindle in the said branch pressure chamber.

A two-way relay poppet 210, having a first integral valve head 212 selectively engaging the valve seat 208, extends between and provides selective interconnection of the main air chamber 188 with the branch pressure chamber 190. This interconnection is accomplished via a second valve head 214 on the relay poppet 210 which cooperates with a fixed valve seat 216 on the main air chamber 188.

The second valve head 214 is normally biased into closed position on the valve seat 216 by means of a compression spring 218 in the main air chamber 188.

Operation

Referring first to FIGURE 1, the operation of the system schematically shown therein is as follows:

Assuming first that the rotor shaft 50 of the stepping motor 46 is in a position of rotation intermediate the limits set by the limit stop means 156, output pulses from the computer output 10 will cause the transfer network 24 to deliver corresponding energizing pulse signals to the input terminals 42 of the stepping motor 46. These pulse signals will cause a quantized rotation of the rotor 48 and rotor shaft 50 for each individual pulse signal, thus "stepping" the rotor 48 through a rotational displacement determined by the number of input pulses applied, the direction of rotation being selected as a function of the state of the signals from the computer output 10 by means of suitable sequencing means, not shown, integral within the transfer network 24.

Each quantized rotation of the rotor 48 is imparted to the rotor shaft 50 which causes the threaded portion 64 thereof to undergo a quantized axial displacement with respect to the fixed internally threaded collar 66. This axial displacement is imparted to the spring push-link 70 by the rotor shaft tip 68, causing a proportional displacement of the bellows 74 and leakport control flap 72.

The resultant displacement of the leakport control flap 72 with respect to the leakport 76 in the nozzle 78 causes a functionally related pressure change to be initiated in the pneumatic relay means 80 which consequently, at the output port 86 thereof, generates a modulated control pressure signal in response and functionally related to the constraints initially placed on the system by the computer 16 via the duration-modulated pulse signals from the computer output terminal 10.

In the event of electrical failure or other reasons, the signal pressure output of the relay means 80 may be manually modulated by the manual override means 52 which serves to rotate the rotor shaft 50 and cause the above-defined sequence of displacements to take place and modulate the output of the said pneumatic relay means 80.

Should the signals from the computer output terminal 10 instruct the system to exceed the preselected design limits of the system, the rotor shaft 50 will drive the limit detecting switch, means 68 to one of its preselected limits of rotation and cause the said limit detecting switch means 50 to actuate suitable alarm or indicator means, not shown, connected with the leads 60 and 62.

The instantaneous rotational displacement or position of the rotor shaft 50, and hence the instantaneous value of signal pressure output of the pneumatic relay means 80 within the proportional band thereof, is continuously monitored by both the mechanical indicator means 54 and the electric transducer means 56. The indicator means 54 may be any suitable mechanically driven indicator. On the other hand, the electric transducer means 56 may be any suitable network which includes a mechanically driven input variable such as well-known rotary variable impedance devices of the three terminal type.

Thus, the mechanical indicator means 54 provides continuous monitoring of the system in close proximity thereto while the electric transducer means provides continuous monitoring of the system in close proximity thereto and/or at a remote point.

Referring now to FIGURES 2, 3, 4 and 5, the operation of the embodiment shown therein is as follows:

Control limits of rotary displacement are first selected for the stepping motor 46 and a corresponding selective adjustment of the relative position of the limit detecting switches 122 and 124 with the switch actuating cam 142 is made. This adjustment is effected by rotating the selector pinions 132 and 134 to cause rotation of the sector plates 126 and 128, respectively, about the cam shaft 130, whereby the cam follower switch actuators 136 and 138, respectively, are selectively positioned on the camming surface 14 of the actuating cam 142.

Next, the control limits of rotary displacement are established at the mechanical indicator mechanism 60 via the adjustable limit stop means 156. The circular stop plates 158 and 160 are rotated relative to each other to determine the relative positions of the discontinuities in the circular stop-slots 162 and 164, respectively, therein, whereby the limit of travel of the indicator index pin 154 in the said slots is defined. By loosening the set screws 174 and 176 in the stop-plate locking means 170 and 172, respectively, and then rotating the manual override knob 52 first in one direction and then the other, the rotor shaft 50, via the splined section 104, drives the driven pinion 120 and the integrally mounted index pin 154 against the discontinuities in the said stop slots 162 and 164 and drives the said discontinuities to the respectively desired control limit positions. The lock means 170 and 172 for the said stop plates 158 and 160, respectively, are then set by means of the set screws 174 and 176, respectively.

Assuming that, for example, the computer output terminal 10 generates an output voltage wherein a unit state signal is a positive fixed amplitude voltage and a zero state signal is a negative voltage of the same fixed amplitude, the stepping motor 46, via the transfer network 24, will be assumed to be constrained to step clockwise in response to positive voltages and counterclockwise in response to negative voltages from the computer output 10.

Since the computer output signal is duration-modulated, the number of clockwise and counterclockwise steps of the motor 46 depends upon the duration of the positive and negative amplitude signals, from the computer output 10, a combination of such signals normally effecting a resultant rotational displacement of the rotor shaft 50 within the control limits set by the limit stop means 56.

Rotation of the rotor shaft 50 results in a corresponding linear displacement thereof via the threaded section 64 and cooperating threaded fixed collar 66, displacing the shaft tip 68 and the pressure plate 182 to modulate the spring force of the push link 70 on the leakport control flap 72.

Restriction of flow through the leakport 76 in the nozzle 78 causes an increase in pressure in the pilot chamber 194 of the relay 80, since this chamber is supplied with a constant flow of air pressure from the main air supply 82 via lead 84, internal port 196, port 200 and in-line restriction 202.

Assuming that clockwise and couterclockwise rotations of the rotor shaft 50 cause a compression and expansion, respectively, of the spring 180 in the push-link 70, then these same directions, respectively, cause a pressure increase and a pressure decrease in the pilot chamber 194 of the pneumatic relay 80.

An increase in pilot pressure causes the floating spindle 204 to move the relay poppet 210 to the left, as shown in FIGURE 2, seating the first valve head 212 on the exhaust seat 208 and unseating the second valve head 214 from the fixed seat 216. This admits main air pressure from the main air pressure chamber 188 into the branch pressure chamber 190 until such time as the force of the branch pressure acting on the diaphragm D1 plus the force of the valve spring 214 balances force of the pilot pressure acting on the diaphragm D2.

Conversely, a decrease in pilot pressure, corresponding to a demand from the computer terminal 10 for a lower value of branch pressure, causes the valve spindle 204 to be displaced to the right, as shown in FIGURE 2, unseating the first valve head 212 of the relay poppet 210 from the floating exhaust valve seat 208, thus venting the branch pressure chamber 190, via the flow port 206, to the exhaust chamber 192, the latter being vented to atmosphere via the flow port 193. Thus, the branch pressure is constrained to seek that value which will cause the first valve head 212 of the relay poppet 210 to reseat on the floating valve seat 208 at which time the forces of the floating spindle 204 will again be balanced.

Simultaneously with changes in the branch pressure in the branch pressure chamber 190, this change is reflected in the rebalancing chamber 88 via the pressure feedback lead 90. Thus, in the rebalancing chamber 88, a force is generated on the bellows 74 and leakport flap 72 in opposition to the force placed thereon by the spring push-link 70 which varies directly with the branch pressure variations, thereby varying the pressure differential between the pilot pressure chamber 194 and the rebalancing chamber 88.

At the balance or equilibrium point of the relay 80 there will be the same outflow of pressure fluid from the pilot chamber 194 through the leakport 76 as there is inflow to the pilot chamber 194 through the flow restrictor 202 and pressure port 200.

Thus, at balance, the pilot pressure in the pilot pressure chamber 194 will be constant.

Thus, the rebalancing chamber 88 provides a stabilizing constraint on the pneumatic relay by permitting rapid response to initial input forces from the push-link 70 due to an initially substantial resulting pressure differential between the pilot pressure and rebalancing chambers 194 and 88, respectively, which differential is continuously modulated to decrease as the control point is approached which satisfies the input force of the push-link 70 on the leakport flap 72, the said input force being a function of the output signal from the computer output 10.

If the duration of any given positive or negative amplitude signal from the computer terminal 10 be longer than necessary to step the motor 46 through one of its preselected maximum control limits of displacement in a given direction, the rotor shaft 50, via the splined section 104, driven pinion 120, drive pinion 118, sector gear 144, cam shaft 130 and actuating cam 142, will cause one of the limit detecting switches 122 and 124 to be actuated and the mechanical stop means 156 will engage the index pin 154 on the driven pinion 120 and prevent rotation of the rotor 48 of the stepping motor 46 beyond the said one of the maximum control limits of displacement.

The position of the index pin 154 in the slot 148 of the dial face 146 provides a direct visual readout of the branch pressure effected by the regulating system.

Remote readout is also provided by the transducer 56, this being modulated at its input by the rotary shaft 114, the latter being driven by the driven pinion 120, of the gear reduction unit 116, in direct propotrion to the rotational displacement of the rotor shaft 50.

As can be seen from the foregoing specification and drawings, this invention provides a new and novel pressure regulating system which generates a control or branch pressure in response to a duration-modulated binary electric signal, wherein the final desired control or branch pressure is approached in a series of discrete quantized steps. Additionally both proximate and remote readout of the instantaneous pressure values and/or analogs thereof are automatically provided.

It is to be understood that the specific preferred embodiments shown and described herein are for the purpose of example only and are not intended to limit the scope of the appended claims.

What is claimed is:

1. A pressure control system comprising a housing, input pressure chamber means disposed in said housing, branch pressure chamber mean disposed in said housing adjacent said input pressure chamber and provided with output conduit means, pilot pressure chamber means disposed in said housing and separated from said branch pressure chamber means by a movable partition, exhaust passage means in said partition connecting said branch pressure chamber to atmosphere, expansible chamber means disposed in said housing including flexible wall means, leakport means interconnecting said pilot pressure chamber means and said expansible chamber means, leakport control flap means mounted on said flexible wall adjacent said leakport means, spring means bearing against said flexible wall means to control the displacement of said flexible wall means and thereby control the flow through said leakport means, passage means interconnecting said branch pressure chamber means with said expansible chamber means, pressure supply means connected through said pressure input chamber means, restricted passage means interconnecting said pressure input chamber means and said pilot pressure chamber means, port means connecting said input pressure chamber means to said branch pressure chamber means, unitary valve means for controlling said port means and said exhaust passage means in response to movement of said movable partition, pulse stepping motor means, shaft means extending through and protruding from both ends of said motor means, one end of said shaft means having screw threads thereon for cooperation with said housing to translate rotary motion of said shaft means to longitudinal motion, and said threaded end of said shaft means being disposed in abutting engagement with said spring means to control the spring pressure on said flexible wall means in response to rotation of said shaft means.

2. A pressure control system as set forth in claim 1 further comprising manual control means connected to the other end of said shaft means.

3. A pressure control system as set forth in claim 1 further comprising electrical transducer means, indicator means, and cam operated limit switch means mounted in said housing adjacent said other end of said shaft means and gear means drivingly connected between said shaft means, said electrical transducer means, said indicator means and said cam operated limit switch means.

4. A pressure control system as set forth in claim 3 wherein said indicator means is provided with adjustable mechanical limit means mounted on said housing.

5. A pressure control system as set forth in claim 3 wherein said cam operated limit switch means includes a rotatable cam disc mounted on a cam shaft connected to said gear means, a pair of switches each mounted on a separate rotatable member journaled for rotation on said cam shaft for rotation about the periphery of said cam and means for adjusting said rotatable members about said cam shaft and locking said rotatable members in adjusted positions.

References Cited

UNITED STATES PATENTS

| | | | |
|---|---|---|---|
| 2,516,333 | 7/1950 | Moore | 137—84 |
| 2,517,051 | 8/1950 | Swenson. | |
| 3,096,690 | 7/1963 | Hayner | 137—85 X |
| 3,222,996 | 12/1965 | Thieme. | |

ALAN COHAN, Primary Examiner